United States Patent [19]

Dunell

[11] Patent Number: 5,713,592
[45] Date of Patent: Feb. 3, 1998

[54] APPARATUS FOR SUPPORTING VEHICLE CONDUIT

[76] Inventor: Noel Henry Dunell, Eel Creek Road, Gympie, Queensland, 4570, Australia

[21] Appl. No.: 549,796

[22] PCT Filed: Apr. 29, 1994

[86] PCT No.: PCT/AU94/00220

§ 371 Date: Nov. 2, 1995

§ 102(e) Date: Nov. 2, 1995

[87] PCT Pub. No.: WO94/26542

PCT Pub. Date: Nov. 24, 1994

[30] Foreign Application Priority Data

May 6, 1993 [AU] Australia ............... 38431/93

[51] Int. Cl.$^6$ ................................ B60D 1/62
[52] U.S. Cl. ............................ 280/420; 280/433
[58] Field of Search ............... 280/420, 421, 280/422, 433

[56] References Cited

U.S. PATENT DOCUMENTS

| | | | |
|---|---|---|---|
| 2,443,035 | 6/1948 | Hardy | 280/420 |
| 2,948,450 | 8/1960 | Dobrikin | 224/42.1 |
| 3,127,194 | 3/1964 | Jeffries | 280/421 |
| 3,781,037 | 12/1973 | Czajkowski | 280/421 |
| 3,901,270 | 8/1975 | Smith | 137/351 |
| 3,985,394 | 10/1976 | Rolfes | 302/34 |
| 4,002,357 | 1/1977 | Bennett | 285/61 |
| 4,249,629 | 2/1981 | Hutt | 280/420 X |

FOREIGN PATENT DOCUMENTS

| | | | |
|---|---|---|---|
| 1236432 | 6/1960 | France . | |
| 3407327 | 8/1985 | Germany . | |
| 2043825 | 10/1980 | United Kingdom . | |
| 2 274 821 | 8/1994 | United Kingdom | 280/420 |

*Primary Examiner*—Victor E. Johnson
*Attorney, Agent, or Firm*—DeLio & Peterson, LLC

[57] ABSTRACT

An apparatus for supporting hydraulic or pneumatic hoses and electric cables which extend between a prime mover and a trailer, comprises an elongate channel shaped member 11 which is attached to an intermediate member 21, the intermediate member being attached to a bearing member 16. Elongate channel shaped member 11 can then swing from side to side and can hold the hoses or cables to prevent damage thereto. The cables can pass through the hollow bearing member 16 and into channel member 11 without needing to be unnecessarily exposed.

13 Claims, 2 Drawing Sheets

APPARATUS FOR SUPPORTING VEHICLE CONDUIT

BACKGROUND OF THE INVENTION

1. Field of the Invention

THIS INVENTION relates to an apparatus for supporting vehicle conduit and especially for supporting hydraulic or pneumatic hoses and electric cables which extend between a leading vehicle (such as a prime mover), and a connected trailing vehicle (such as a trailer). The apparatus is also applicable for supporting conduit extending between leading and trailing trailers of multiple trailered vehicles (such as road trains and sugar cane trucks).

2. Description of the Related Art

Road trailers are either mounted directly to a prime mover (ie. truck), or in the case of multiple trailered vehicles, to another trailer. These trailers are connected by known connecting bars which form no part of the invention. As these trailers are provided with hydraulic or pneumatic brakes, and stop lights and indicator lights, the conduit (ie hydraulic and pneumatic hoses, electric cables), must also be interconnected either with the prime mover, or with another trailer.

As the trailers exhibit angled motion relative to each other, and occasionally the angle between the leading and trailing vehicle can be quite acute, it is necessary to ensure that the conduit has sufficient slack in it to not be stretched or damaged.

Conventionally, this has been achieved either by the use of pogo sticks which causes the conduit to be looped in a vertical orientation, or by the use of suzy coils, whereby the conduit is formed into a coil spring. Both of these arrangements have the disadvantage that the conduit can be snagged or damaged as they are highly exposed.

OBJECT OF THE INVENTION

The present invention has been developed to provide an alternative to the existing suzy coils or pogo sticks which can support conduit in a less exposed manner while still preventing stretching or damage to the conduit upon angled movement between trailers, or between a trailer and a prime mover.

In one form, the invention resides in an apparatus for supporting conduit extending between a leading vehicle and a connected trailing vehicle, the apparatus comprising an elongate member adapted to support the conduit, the apparatus being rotatably mounted to the leading or trailing vehicle such that the elongate member can swing in response to angled movement between the leading and trailing vehicles.

It can be seen by having the conduit (ie. hydraulic or pneumatic hoses or electric cabling) secured to an elongate member, and having the elongate member rotatably mounted so that it can swing from side to side, the conduit is protected by the elongate member, yet is not subject to stretching or damage should the leading and trailing vehicles exhibit angled motion relative to each other.

The elongate member may be substantially channel shaped in cross-section and therefore may be provided with a pair of side walls and a bottom wall. The conduit may therefore be supported by lying substantially within the channel member. The size of the side walls and the bottom wall may vary depending on the size and number of hoses/electric cables which are to be supported.

The apparatus may be rotatably mounted to the leading or trailing vehicle through a bearing member. The bearing member may have a first part which can be fixed to the leading or trailing vehicle, and a second part which can be rotatably mounted to the first part. Suitably, the first part includes a horizontal flange which can be bolted or welded to the vehicle, and which includes a hollow cylindrical upstanding portion, and the second part comprises a cylindrical sleeve which can be rotatably mounted to the upstanding portion.

The apparatus may include an intermediate member which can extend between the elongate member, and the bearing member. The intermediate member may also be channel shaped and dimensioned such that the elongate member can sit within the channel shape of the intermediate member. Suitably, the intermediate member is fixed to the second part of the bearing member, such that the intermediate member (and therefore the elongate member) can exhibit swinging movement from side to side.

To protect the bearing against damage, it is preferred that the intermediate member is formed from a stronger material, and the elongate member is formed from a weaker material. In practice, the elongate member may be formed from aluminium, and the intermediate member may be formed from steel. Thus, should the apparatus receive a hard knock, the elongate member may be preferentially deformed or damaged therefore minimizing damage to the bearing member and intermediate member. Therefore, it is also preferred that the elongate member is releasably mounted to the intermediate member and this can be achieved by way of bolts and the like. The intermediate member suitably extends along the elongate member and adjacent one end thereof, and also suitably extends along a minor portion of the elongate member.

The elongate member and intermediate member may include openings through which the conduit can pass. The openings are suitably adjacent one end of the elongate member and intermediate member. It is also preferred that the intermediate member is attached to the bearing member such that conduit can pass through the bearing member and through the opening in the intermediate member and channel member. This again minimizes exposure of the conduit to damage.

To minimise inadvertent removal of the conduit from the elongate channel member, it is preferred that retention members are provided. The retention members may be in the form of elongate rods which may be removably attached to the walls of the channel member, and the conduit can then be retained between the retaining members, and the walls of the channel member.

BRIEF DESCRIPTION OF THE DRAWINGS

An embodiment of the invention will now be described with reference to the following drawings in which.

DESCRIPTION OF THE PREFERRED EMBODIMENTS

Figure 1:
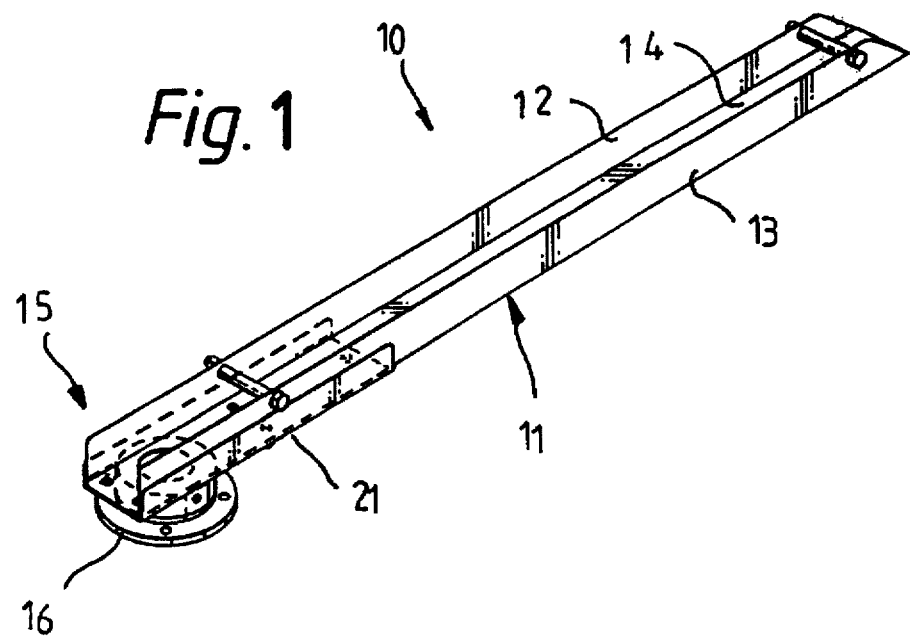
FIG. 1 is an assembled view of an apparatus according to an embodiment of the invention.

Referring to the drawings there is disclosed an apparatus 10 for supporting conduit (such as hydraulic or pneumatic hoses, electric cables or the like) and which conduit normally extends between a leading vehicle (such as a prime mover, or a leading trailer), and a trailing vehicle (such as a trailer). Apparatus 10 includes an elongate member 11 which in the embodiment is formed from aluminium, and has a channel shaped configuration comprising a pair of side walls 12, 13 and bottom wall 14. The elongate member can be rolled from a sheet or plate of aluminium or other material. The length of elongate member 11 depends on the distance between the leading vehicle and the trailing vehicle but typically is between 1–2 meters. Also, the size of the channel section can vary depending on the number and size of the hoses or cables to be supported therein, but in an embodiment, the side walls are typically 50 mm high and the bottom is typically 80 mm wide. The thickness of the aluminium can vary but in an embodiment is 3 mm.

Figure 2:
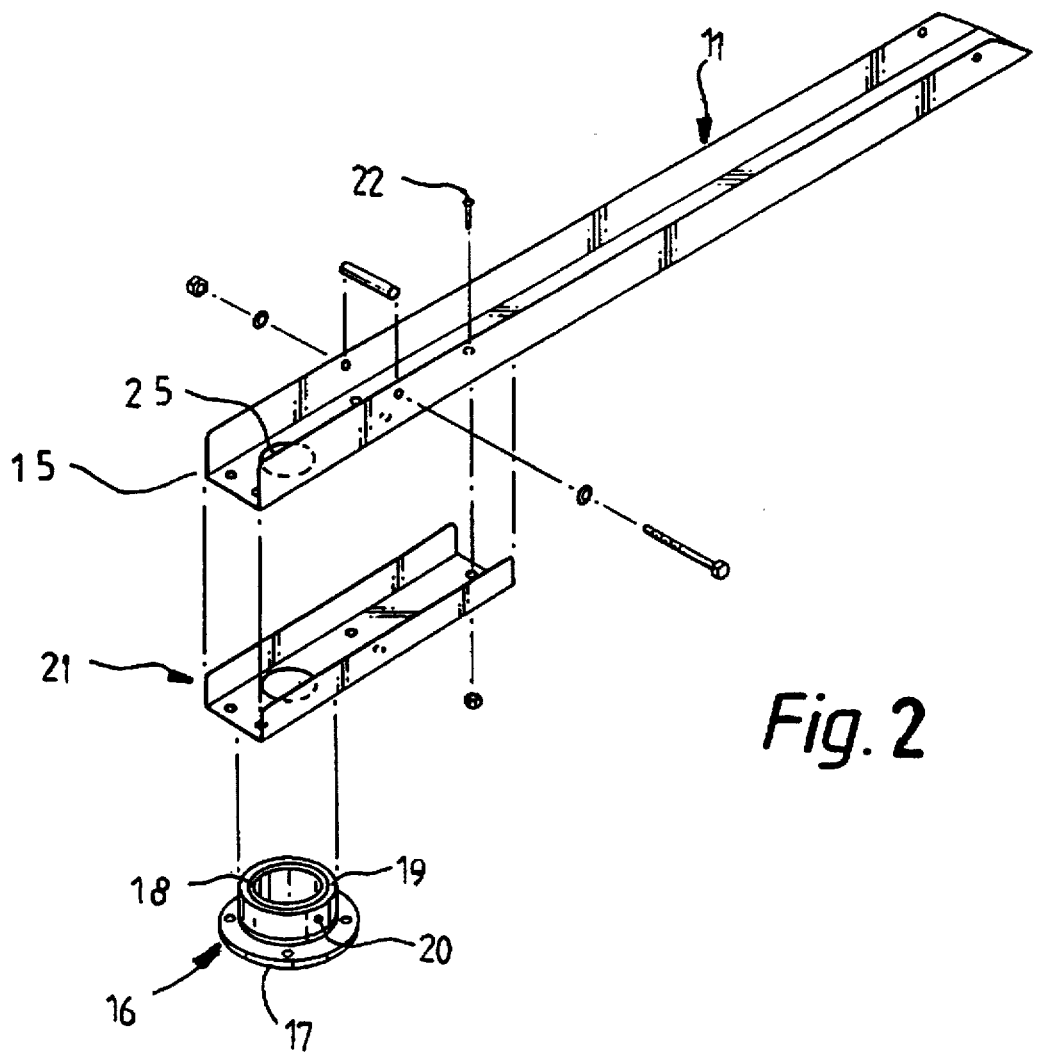
FIG. 2 is an exploded view of the apparatus of FIG. 1.

Elongate member 10 is rotatably mounted adjacent one end 15 by attachment relative to a bearing member 16. Bearing member 16 is more clearly illustrated with reference to FIG. 2 and comprises a first and second part made from steel. The first part includes a horizontal flange 17 which can be bolted or welded to one of the vehicles. The first part further includes an upstanding hollow cylindrical portion 18. About cylindrical portion 18 is rotatably mounted a second part in the form of cylindrical sleeve 19. Sleeve 19 can rotate about cylindrical part 18 and is retained by a grub screw 20 which locates within an annular recess (not shown), located on an outer wall of portion 18.

Figure 3:
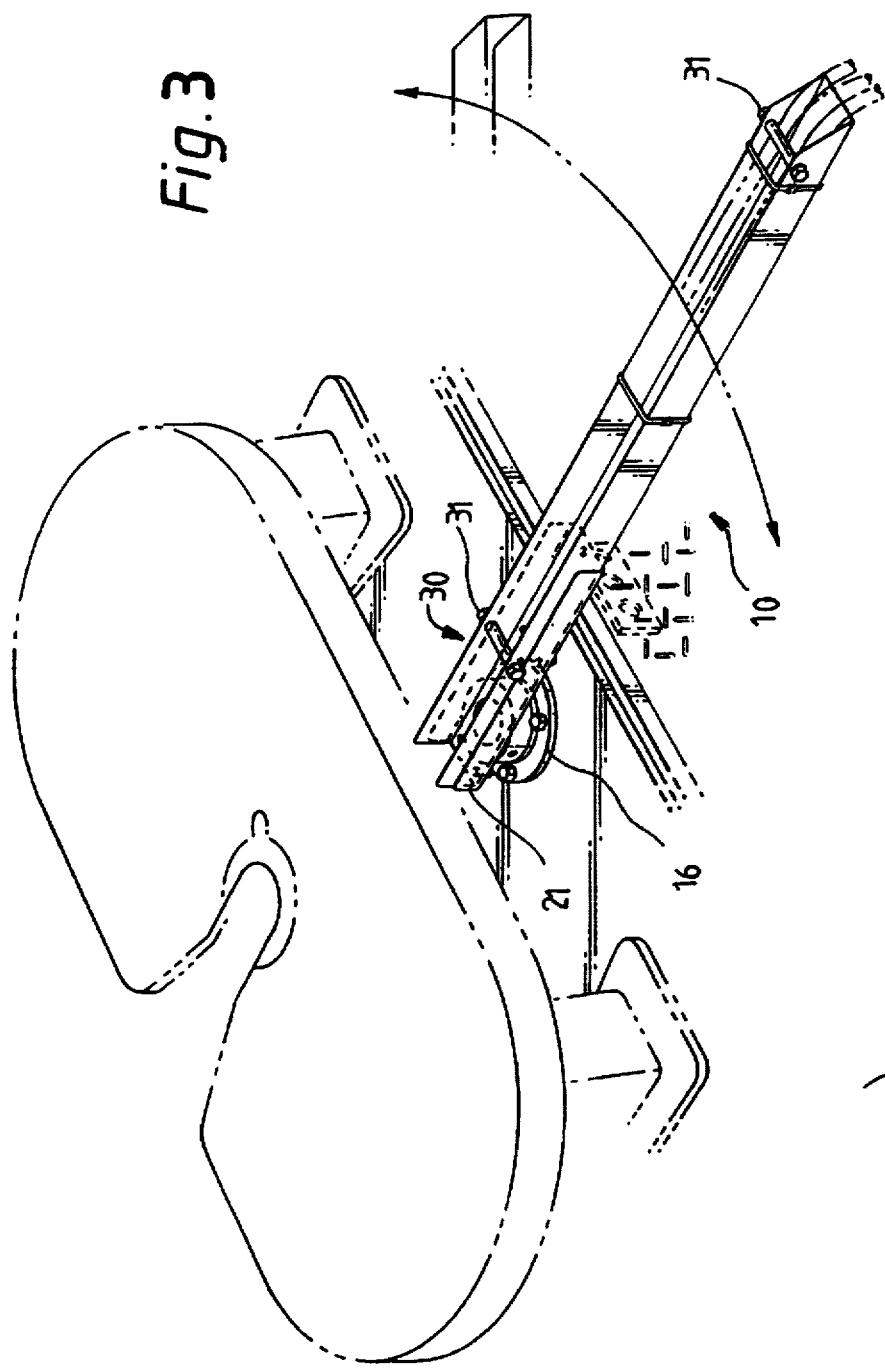
FIG. 3 illustrates an embodiment of the apparatus attached to a vehicle.

FIG. 3 illustrates bearing member 16 bolted to a portion of a vehicle.

Apparatus 10 further includes an intermediate member 21 which is formed from steel plate. Intermediate member 21 is also channel shaped in configuration and is sized such that elongate member 11 sits within channel shaped intermediate member 21. Intermediate member 21 extends from adjacent end 15 of elongate member 11 and along a minor portion of member 11. In an embodiment, the length of intermediate member 21 is approximately 400 mm.

Elongate member 11 is removably mounted to intermediate member 21 through a plurality of bolts 22 the reason for which will be described with greater detail below.

Intermediate member 21 is welded or otherwise secured to second part 19. As second part 19 is rotatably mounted to upstanding portion 18, intermediate portion 21 by being welded or otherwise fixed thereto, also exhibits swinging movement. Additionally, by having elongate member 11 bolted to intermediate member 21, the elongate member also exhibits a swinging movement.

The one end 15 of elongate member 11 is provided with an aperture 25 which aligns with an aperture 26 in intermediate member 21, when elongate member 11 is bolted to intermediate member 21. Also, bearing member 16 is hollow as particularly illustrated in FIGS. 2 and 4, and the opening 26 in intermediate member 21 is aligned with the bore extending through bearing member 16, when the intermediate member 21 is fixed to bearing member 16.

Figure 4:
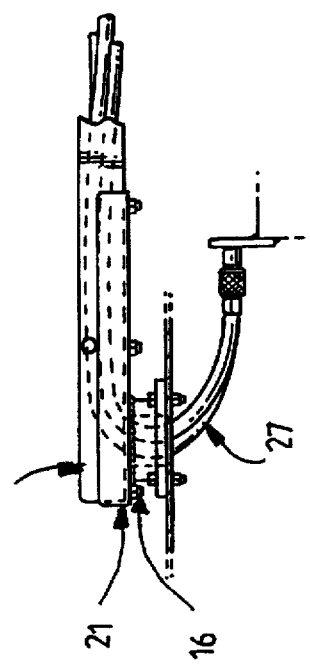
FIG. 4 is a side view of one end of the apparatus.

Thus, as particularly illustrated with reference to FIG. 4, conduit 27 can pass through bearing member 16, intermediate member 21 and through opening 25 and then can be supported within the channel shaped section of elongate member 11.

By having elongate member 11 formed from a weaker material (ie, aluminium), than intermediate member 21 (typically formed from steel), elongate member 11 becomes a sacrificial member and will preferentially be damaged or buckled should apparatus 10 come under high load conditions or be subjected to large forces. The advantage of this arrangement is that it is easier to replace elongate member 11 than it is to replace a possibly damaged bearing 16.

FIG. 3 illustrates an attached apparatus. In the figure, an opening is cut out of fifth wheel or turntable 30, and bearing member 16 is bolted or welded over the opening (see FIG. 4), such that conduit 27 can pass through fifth wheel or turntable 30 and along elongate member 11.

To minimize the possibility of the conduit being removed from elongate member 11, a plurality of retention members 31 are provided. Retention members 31 are in the form of bolts which can be removed from elongate member 11. If desired, the bolt body can be encased in a plastic tube to minimizes rubbing or degradation of conduit lying within the channel.

It can be seen that the apparatus according to the invention maintains the conduit in a neat and low profile position, and therefore minimizes or eliminates any possibility of snagging or other damage to the conduit. It should be appreciated that various other changes and modifications can be made to the embodiment described without departing from the spirit and scope of the invention as defined in the appended claims.

I claim:

1. An apparatus for supporting conduit extending between two vehicles, the apparatus comprising an elongate member for supporting the conduit within the elongate member, and an intermediate member attached to a bearing member, the intermediate member attached to the elongate member, the bearing member rotatably mounting the intermediate member to one of said vehicles such that the elongate member can swing in response to angled movement between the vehicles, wherein the elongate member is formed from a weaker material than the intermediate member, such that the elongate member will be preferentially damaged in the case of a large load or force being applied to the apparatus.

2. The apparatus as claimed in claim 1, wherein the elongate member is channel shaped when viewed in cross-section.

3. The apparatus as claimed in claim 2, wherein the bearing member includes a first part fixed to one of said vehicles, and a second part rotatably mounted to the first part.

4. The apparatus as claimed in claim 3, wherein the first part includes a horizontal flange fixed to one of said vehicles, and includes a hollow cylindrical upstanding portion, and the second part comprises a cylindrical sleeve rotatably mounted to the cylindrical upstanding portion.

5. The apparatus as claimed in claim 4, wherein the intermediate member is attached to the second part of the bearing member.

6. The apparatus as claimed in claim 5, wherein the elongate member is provided with at least one retaining member to assist in retaining conduit to the elongate member.

7. The apparatus as claimed in claim 6, wherein the at least one retaining member is removably mounted to the elongate member.

8. The apparatus as claimed in claim 7, wherein the elongate member includes an opening through which conduit can pass.

9. The apparatus as claimed in claim 8, wherein the intermediate member is provided with an opening to allow conduit to pass therethrough.

10. The apparatus as claimed in claim 9, wherein the bearing member is provided with an internal bore through which conduit can pass.

11. The apparatus as claimed in claim 10, wherein the openings in the elongate member, intermediate member and the bore in the bearing member are aligned such that conduit can pass through the bearing member, through the intermediate member, and through the elongate member.

12. The apparatus as claimed in claim 11, wherein the bearing member is mounted to a vehicle fifth wheel.

13. The apparatus as claimed in claim 12, wherein the intermediate member is channel shaped in cross-section, the elongate member being releasably mounted to the intermediate member, and being able to nest within the channel shaped intermediate member, the intermediate member extending along a minor portion of the elongate member.

* * * * *